(12) United States Patent
Geiss et al.

(10) Patent No.: US 8,728,191 B2
(45) Date of Patent: May 20, 2014

(54) TRACTOR CAB AIR FILTER HOUSINGS

(75) Inventors: Hermann Geiss, Marktoberdorf (DE); Alexander Zeller, Fussen (DE); Stefan Mayr, Bobing (DE); Andreas Stieglitz, Marktoberdorf (DE)

(73) Assignee: AGCO Corporation

( * ) Notice: Subject to any disclaimer, the term of this patent is extended or adjusted under 35 U.S.C. 154(b) by 296 days.

(21) Appl. No.: 13/125,996

(22) PCT Filed: Oct. 23, 2009

(86) PCT No.: PCT/EP2009/063966
§ 371 (c)(1), (2), (4) Date: Jun. 22, 2011

(87) PCT Pub. No.: WO2010/049358
PCT Pub. Date: May 6, 2010

(65) Prior Publication Data
US 2011/0252756 A1    Oct. 20, 2011

(30) Foreign Application Priority Data
Oct. 27, 2008  (GB) .................................. 0819632.1

(51) Int. Cl.
*B01D 39/00* (2006.01)

(52) U.S. Cl.
USPC ................ 55/478; 55/378; 55/385.3; 55/433; 55/493; 55/505

(58) Field of Classification Search
USPC ........ 55/378, 478, 480, 493, 433, 505, 385.3, 55/418–419; 454/136, 158
See application file for complete search history.

(56) References Cited

U.S. PATENT DOCUMENTS

| | | | |
|---|---|---|---|
| 4,365,541 A | 12/1982 | Marqyes et al. | |
| 5,119,718 A * | 6/1992 | Wagner et al. | ................. 454/158 |
| 5,554,205 A | 9/1996 | Ernst et al. | |
| 6,312,327 B1 * | 11/2001 | Hachmann et al. | ............ 454/158 |
| 2007/0289268 A1 * | 12/2007 | Smith | ........................... 55/385.3 |

FOREIGN PATENT DOCUMENTS

| | | |
|---|---|---|
| EP | 0438076 A | 7/1991 |
| GB | 2106634 A | 4/1983 |

OTHER PUBLICATIONS

International Search Report for International Application No. PCT/EP2009/063966 published May 6, 2010.
UK Search Report for GB Application No. GB0819632.1 dated Feb. 26, 2009.

* cited by examiner

Primary Examiner — Robert Clemente
Assistant Examiner — Karla Hawkins

(57) ABSTRACT

A generally rectangular tractor cab air filter housing arrangement (20) has a main body portion with inlet zones (20a) at each end through which air enters the housing, a first outlet aperture (20c) in the housing over which a filter element (18) is supported, and a second aperture in the housing in which a door (21) is pivoted to provide access to the filter for maintenance. The inlet zones (20a) are formed as chambers which are structurally interconnected by side portions (20d) of the housing so that the housing can be formed as a single piece hollow plastics molding. The door (21) may also be a hollow single piece plastics molding. Both the housing and/or the door may be formed by blow molding or rotational molding.

10 Claims, 9 Drawing Sheets

TRACTOR CAB AIR FILTER HOUSINGS

TECHNICAL FIELD

This invention relates to tractor cab air filters housings for use in HVAC systems in which air to be distributed to the inside of the cab is drawn into the system by a HVAC unit via an air filter mounted in the filter housing.

BACKGROUND

The term "HVAC system" or "HVAC unit" as used throughout this patent application is to be interpreted as covering a system or unit which at its simplest simply draws air in via the filter and distributes this filtered air to the inside of the cab or a system or unit which additional heats and/or conditions the air which is drawn in via the filter.

It is desirable for the filter to be readily accessible in the housing for easy replacement or cleaning. Also the housing needs to be cheap to manufacture and to have the necessary structural rigidity. The housing may also need to have a relatively intricate shape to join with ducting which conducts air to and from the air filter. EP0438076A shows a tractor cab filter arrangement in which air is drawn into the cab via separate filters at each side of the cab. U.S. Pat. No. 4,365,541 shows a cab filter arrangement in which two filters can be accessed via a single service point.

SUMMARY OF THE INVENTION

It is therefore an object of the present invention to provide a tractor cab filter housing which meets the above requirements.

Thus according to the present invention there is provided a generally rectangular tractor cab air filter housing arrangement having a main body portion with inlet zones at each end through which air enters the housing, a first outlet aperture in the housing over which a filter element is supported, and a second aperture in the housing in which a door is pivoted to provide access to the filter for maintenance, the housing being characterised in that the inlet zones are formed as chambers which are structurally interconnected by hollow side portions of the housing so that the housing can be formed as a single piece hollow plastics moulding.

Preferably the door is also a hollow single piece plastics moulding.

Both the housing and/or the door are preferably formed by blow moulding or national moulding.

The housing may include a filter mounting surface which surrounds the outlet aperture, the filter element being clamped against the mounting surface.

Exterior sealing means may be provided on the housing which surrounds the outlet aperture of the housing, the exterior sealing means being sealed against an exterior surface of an associated tractor cab, the filter element being clamped against a filter mounting surface which surrounds an aperture in the exterior surface of the cab within the exterior sealing means.

The filter element may be clamped against the filter mounting surface by a frame which surrounds the filter element.

Preferably the filter element is of generally rectangular block form, the periphery of one side of the block being clamped against the filter mounting surface and the remaining five sides of the filter element all being arranged to receive incoming air to be filtered.

The invention also provides a generally rectangular tractor cab air filter housing arrangement having a main body portion with inlet zones at opposite ends through which air enters the housing, a first outlet aperture in the housing over which a filter element is supported in the main body portion, and a second aperture in the housing in which a door is pivoted to provide access to the filter for maintenance, a peripheral portion of one side of the filter element being clamped against a filter mounting surface which surrounds the outlet aperture and the remainder of the filter element, other than said one side, being exposed in the main body portion of the housing to incoming air to be filtered.

BRIEF DESCRIPTION OF THE DRAWINGS

The present invention will now be described, by way of example only, with reference to the accompanying drawings in which:—

DETAILED DESCRIPTION OF EXAMPLE EMBODIMENTS

Figure 1:
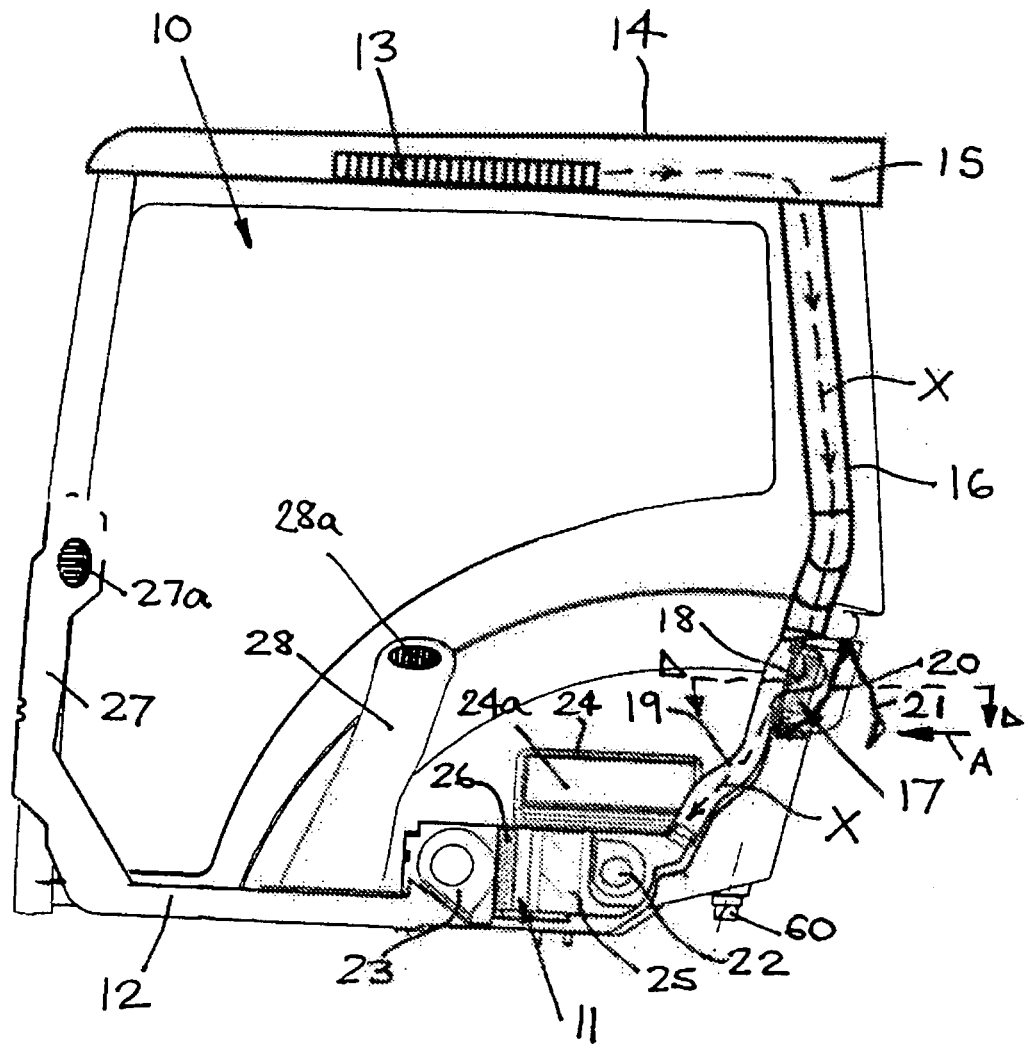
FIG. 1 shows a side view, partly in section, of a tractor cab having an air filter housing in accordance with the present invention.

Referring to the drawings a tractor cab 10 has an HVAC unit 11 mounted on the floor 12 of the cab. Air intakes 13 are provided in the sides of the roof 14 of the cab through which air is drawn into the HVAC unit 11 via ducts 15 in the roof and both rear pillars 16 of the cab and through a fresh air filter unit 17 which contains a filter element 18 into a duct 19 connected with the intake of the HVAC unit 11. A cross member 100 extends between pillars 16. By drawing air into the system via intakes 13 in the roof the level of dust and dirt in the intake air is minimised. The air flow from intakes 13 to the HVAC unit 11 is shown by the dotted line paths X in FIGS. 1 and 2.

The air enters filter unit 17 generally horizontally from both sides. The air filter unit has a housing 20 provided with an opening access door 21 enabling the operator to access the filter element 18 for maintenance or renewal.

Figure 12:
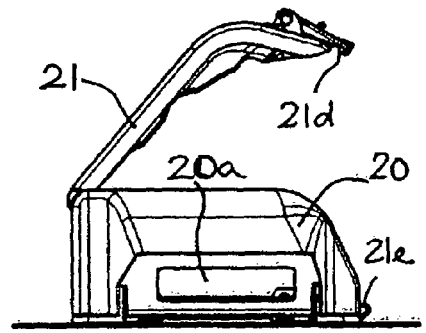
FIG. 12 shows a view in the same direction as FIG. 11 with the filter housing access door open.
Figure 11:
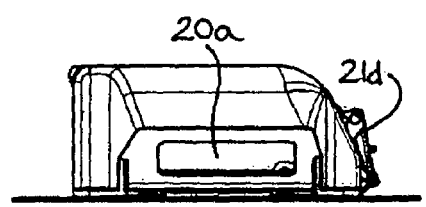
FIG. 11 shows a view in the direction of the arrow B of FIG. 10 with the filter housing access door closed.
Figure 13:
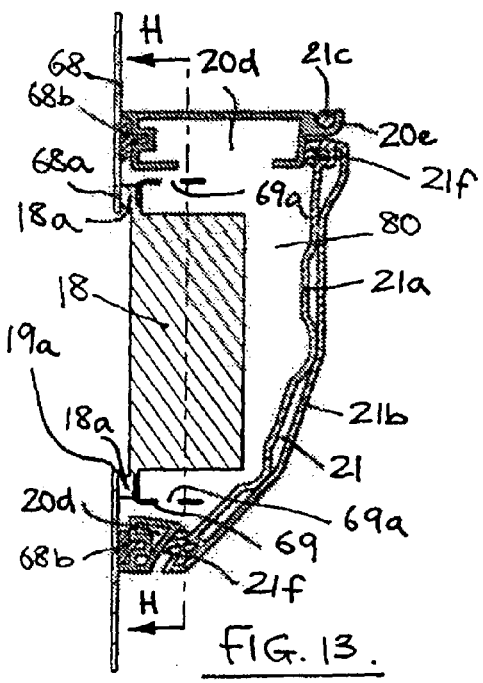
FIG. 13 shows a section on the line C-C of FIG. 10.
Figure 14:
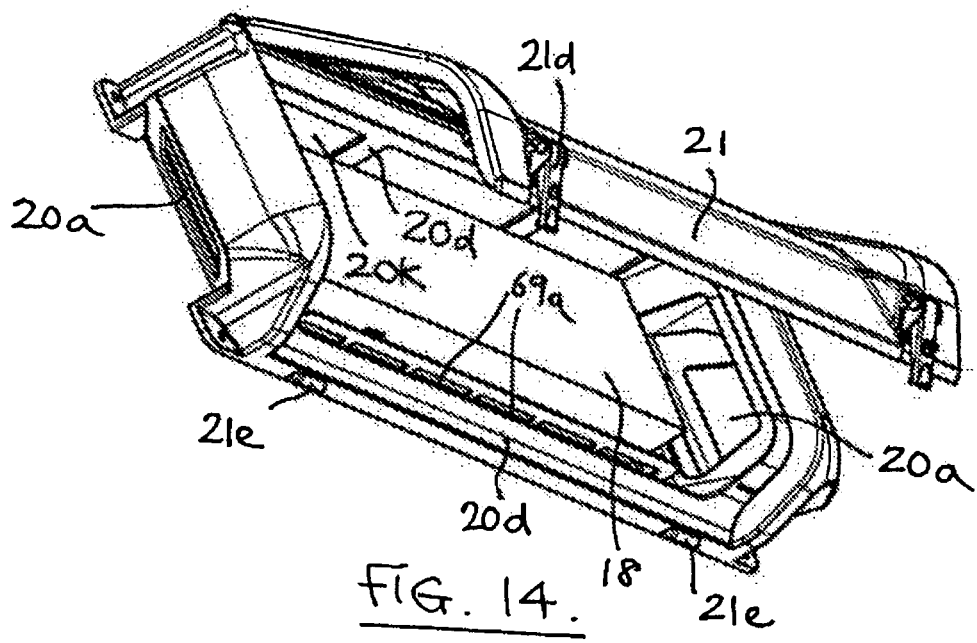
FIG. 14 is a perspective view of the filter housing with the access door open.

FIGS. 12 to 14 these show filter housing 20 which has an inlet opening 20a which is sealed at 65 to an outlet 66 provided in the adjacent cab pillar 16. The structural pillar 16 is surrounded by sheet metal or plastics panel work 67 which includes a rear external panel 68 of the cab. In the arrangement shown in FIGS. 12 to 14, the air filter 18 includes a peripheral sealing area 18*a* which is clamped against a portion 68*a* of the rear panel 68, which surrounds an output aperture 19*a* formed in the rear panel 68 of the cab, by a frame 69 and an associated wing nut 70 which engages bolts 71 to the rear panel 68. Aperture 19*a* leads to duct 19.

The HVAC unit 11 includes a pressurization blower 22 to overcome the pressure drop caused by the long air intake path X, which is somewhat restrictive due to being narrow and including various bends. A main blower 23 is also provided to push air from the HVAC unit 11 into the cab, to draw air through an evaporator 25 and a heater core 26, and to suck air into the unit via recirculation ducts 24 via path Y. Main blower 23 is not provided to suck the air into the HVAC unit along intake path X. Without the pressurization blower 22, the air flow from the HVAC unit would be too small for reasonable system performance.

The heater core 26 is provided with an electronically controlled valve (not shown) for regulating the mass flow and therefore the heating performance of the heater core 26. The evaporator is also equipped with an evaporator valve (not shown) for vapourizing the refrigerant. Additionally the overall control unit for the HVAC system can be housed within a housing 40 of the HVAC unit 11. The HVAC unit 11 also has an external central electric connector for all the electrical connections of the unit thus providing easy plug and play installation of the HVAC unit.

The main blower 23 distributes air from the HVAC unit to a front distributor 27 to provide air to defrost/defog the front screen and front windows of the cab and also provide processed air for the driver. Fender distributors 28 on the left and right fender provide air to the side windows of the cab and also to the side of the driver. All these distributors 27 and 28 are equipped with nozzles 27*a* and 28*a* respectively to control the air distribution within the cab. These nozzles can be adjustable and/or closed by hand.

Figure 3:
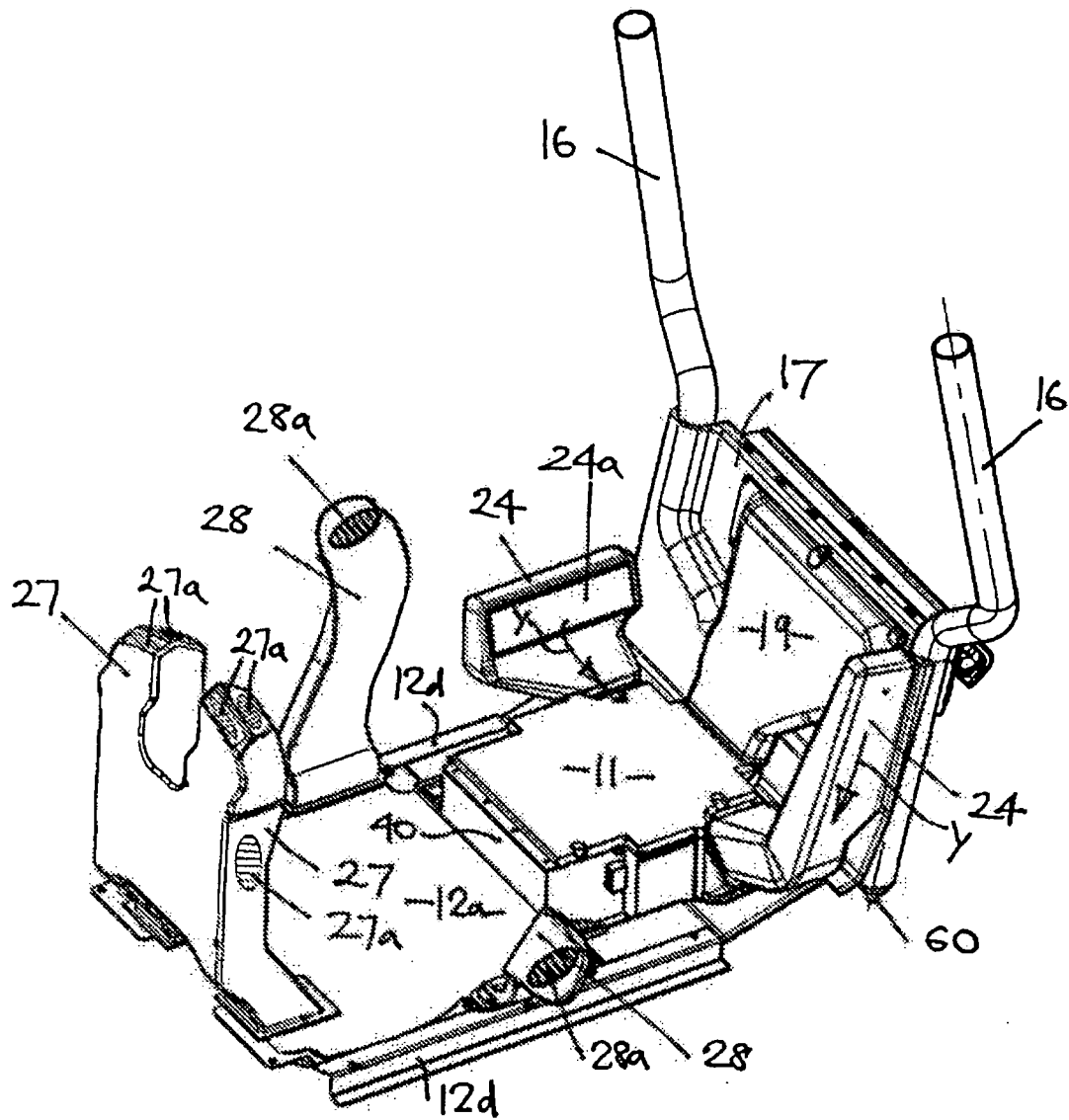
FIG. 3 shows a perspective view of part of the lower part of the cab of FIG. 1.
Figure 4:
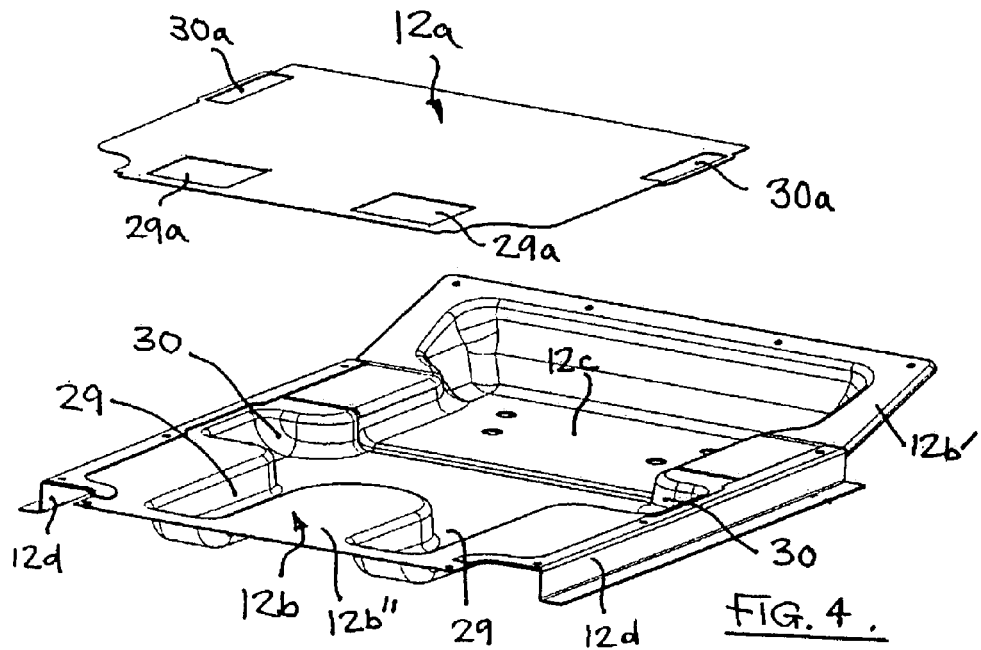
FIG. 4 shows an exploded perspective view of the two layer cab floor.

In accordance with the Applicant's co-pending UK Patent Application No. [Applicant's Reference 7887], the HVAC unit 11 is connected with the distributors 27 and 28 by cavities in the form of passages 29 and 30 formed in the hollow floor 12 of the cab (see FIG. 4). It is a main task of these passages in the floor to transport the air from the HVAC unit with a minimum of pressure drop and noise emission. The floor 12 comprises an upper layer 12*a* and a lower layer 12*b* which are welded and sealed together to provide the necessary structural integrity of the floor and to seal the sides of the passages 29 and 30 (see FIG. 4). The HVAC unit 11 is mounted in a recess 12*c* provided in the rear portion 12*b*' of the lower layer 12*b* of the floor. As most clearly visible in FIG. 4, the rear portion 12*b*' of the lower layer 12*b* of the floor is a separate component which is welded or otherwise secured to the front portion 12*b*" of the lower layer. This facilitates manufacture of the lower layer 12*b*. Flanges 12*d* are welded or otherwise secured to the sides of lower layer 12*b* for securing the floor of the other structural portions of the cab. The upper layer 12*a* has outlets 29*a* and 30*a* which connect passages 29 and 30 with distributors 27 and 28 respectively as shown in FIGS. 3 and 4.

The floor layer 12*a* and 12*b* may be made from steel sheets which or can be made from reinforced plastics material which is glued or otherwise secured together.

The cavities formed between the floor layers 12*a* and 12*b* can also or alternatively be used to run electric wiring or hydraulic pipes or hoses through and/or for the storage of fluids such as screen washer liquid. One or more access hatches 50 are provided in the upper layer 12*a* of the floor to give access to the cavity between the floor layers. These hatches are accessible via access flaps in a rubber mat (not shown) which extends over the upper layer 12*a* of the floor.

Figure 5:
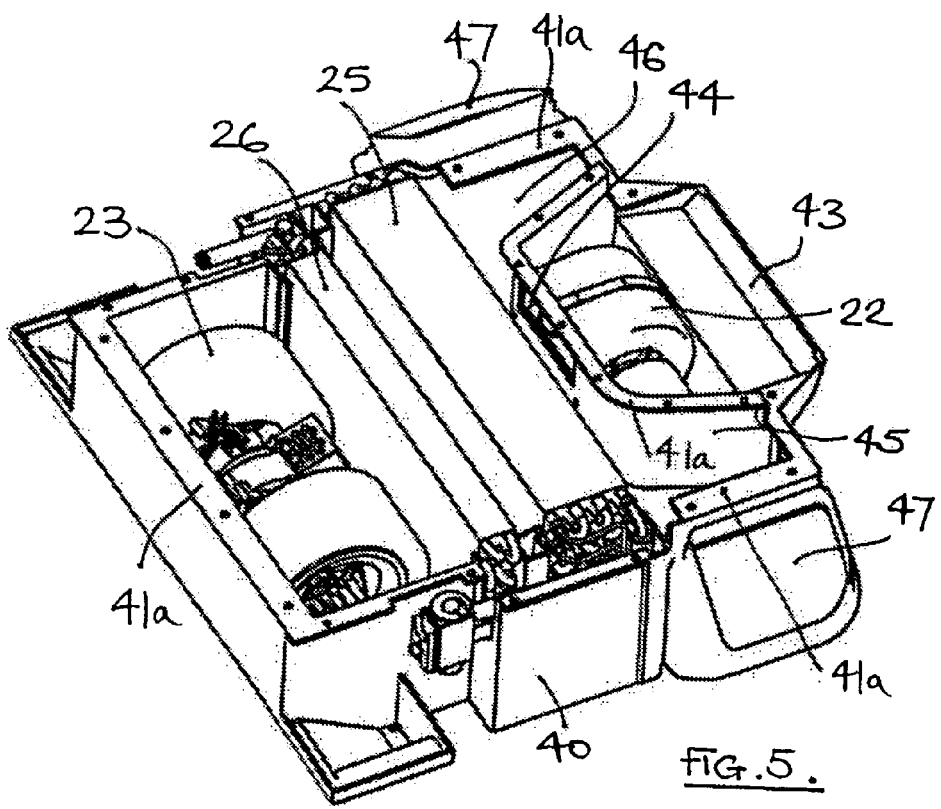
FIG. 5 shows a perspective view of a heating/ventilating unit used in conjunction with the air filter of the present invention with its cover removed for clarity.

The HVAC unit 11 housing 40 is preferably injection moulded and has a lower part 41 and a cover (which is removed in FIG. 5) and which is secured to a peripheral flange 41*a* on the lower part 41 of the housing 40.

The fresh air from filter unit 17 is drawn into the HVAC unit 11 via fresh air intake 43 by the pressurization blower 22 and pushed, via an aperture 44 in a partition wall 45, into a reservoir chamber 46 which is placed ahead of the evaporator 25.

Due to the suction effect caused by main blower 23, air is also sucked via recirculation intakes 47 in the housing 40 on both sides of the HVAC unit 11 into the reservoir chamber 46. Recirculation intakes 47 are connected with ducts 24.

Both fresh air and also recirculation air are sucked into the HVAC unit in order to improve the performance of the system by reducing the time to reach the cab temperature set-point.

Also, in an area with unpleasant odours recirculation air is chosen to reduce smell nuisance.

Each duct 24 is provided with the recirculation air filter element 24*a* is placed to the side of the cab seat near the fenders. These filters must also be readily removeable for maintenance.

The fresh air and recirculation air flows, are mixed in the reservoir chamber 46 and then sucked through evaporator 25 and heater core 26. Depending on the mode or set-point of the cab temperature, heater core 26 or evaporator 25 is heating up or cooling down the air stream. Finally, the main blower 23 pushes the HVAC output air to the distributors 27 and 28.

The ratio between fresh air and recirculated air in this embodiment is mainly regulated (in a new condition without significant filter load) by the ratio of the speeds of the pressurization blower 22 and the main blower 23. If the pressurization blower 22 is switched off or is not operating, a main blower 23 with sufficient performance can still be capable of sucking in fresh air. Thus the system can still meet the legal requirement to add fresh air to the cab in certain conditions to ensure air quality (to avoid suffocation and to control the CO ratio). The use of two blowers ensures that, even if the filter is very dirty and the pressure drop is increasing, adequate air exchange can still be obtained.

Any water, dust and other debris which has been drawn into the roof rear pillars 16 can be emptied from the lower ends of the rear pillars via rubber/plastics sealing valves or teats 60 (see FIG. 8) which have flaps 61 which define a slot 62 therebetween and which are normally drawn towards each other by the low pressure created within the pillars to seal the lower ends of the pillars during use of the heating/ventilating system.

Figure 2:
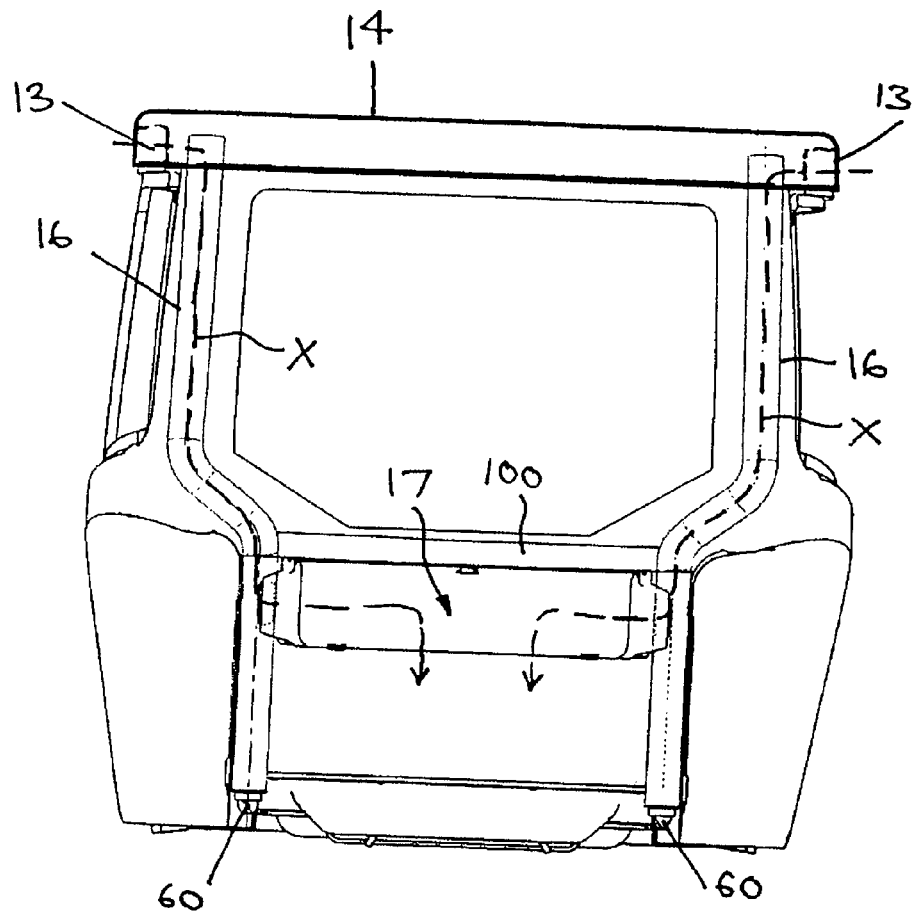
FIG. 2 show a rear view of the cab of FIG. 1.
Figure 8:
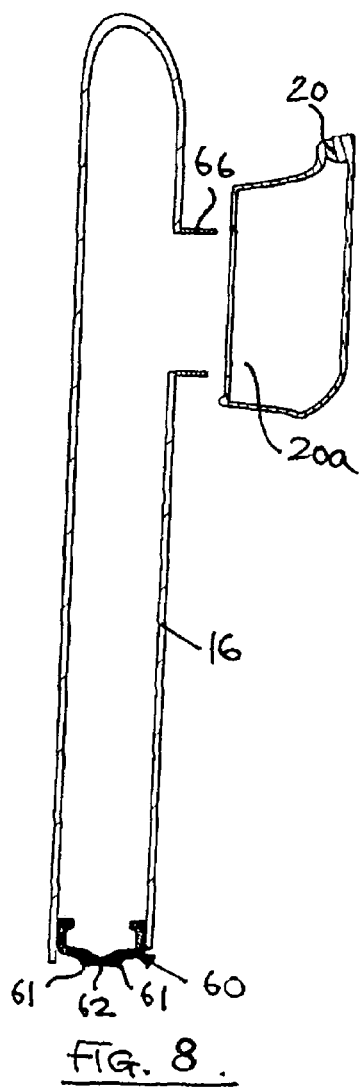
FIG. 8 shows a section on line E-E of FIG. 7.
Figure 16:
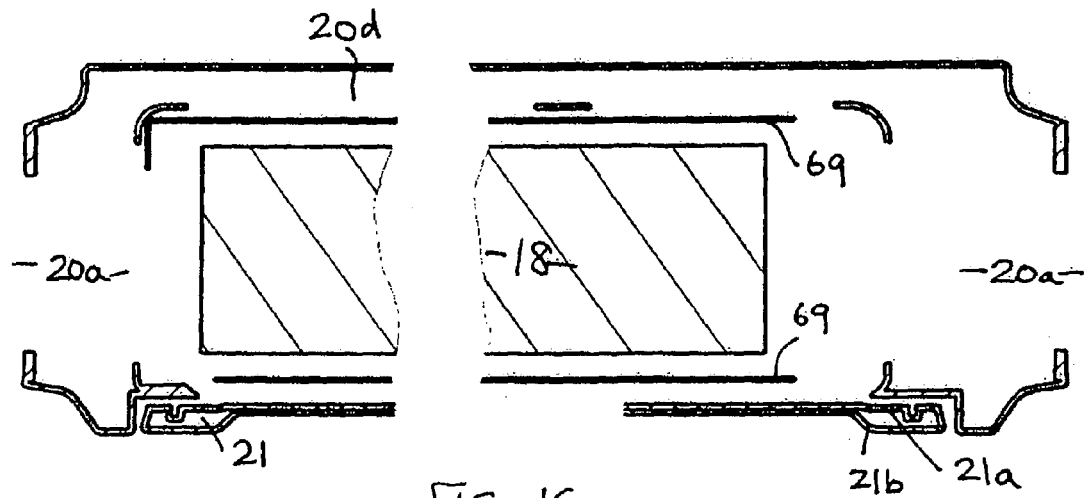
FIG. 16 is a section on the line H-H of FIG. 13.

As can be seen from FIGS. 2 and 8, the air flow travels down the pillars 16 and executes a right angle turn as it enters the filter housing. Thus any water drops, dust or other debris which is in this air stream is relatively dense compared to the air and therefore tends to carry straight-on past the entry into the filter housing and to collect in the lower ends of the pillars above the flaps 61 of the sealing teats/valves 60. If the weight of water, dust or other debris resting on the teats/valves 60 is exceeding a certain level, or overpressure of the cab occurs due to slamming the door, the slots 62 between the flaps 61 are opened and thus the water or other debris is flushed or discharged. Alternatively, to empty this water, dust or debris the tractor operator simply squeezes the rubber/plastic sealing teats to open the slots 62 between the flaps 61 and allow the water, dust and debris to fall from the pillars.

In an alternative construction (not shown) the lower ends of the pillars 16 may be closed-off by spring loaded pivoting flaps (instead of the teats 60) which are again opened either manually, or by the weight of the water, dust or debris which has collected above the flaps or by the over pressurisation of the cab when the door is slammed.

Figure 6:
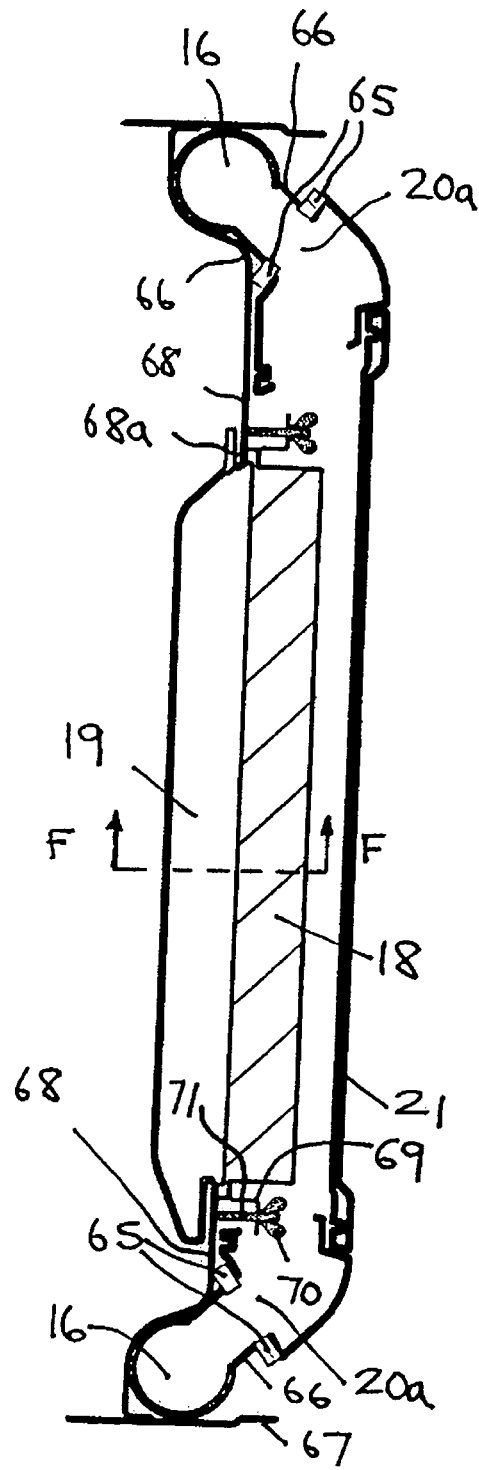
FIG. 6 shows a section on the line D-D of FIG. 1.
Figure 7:
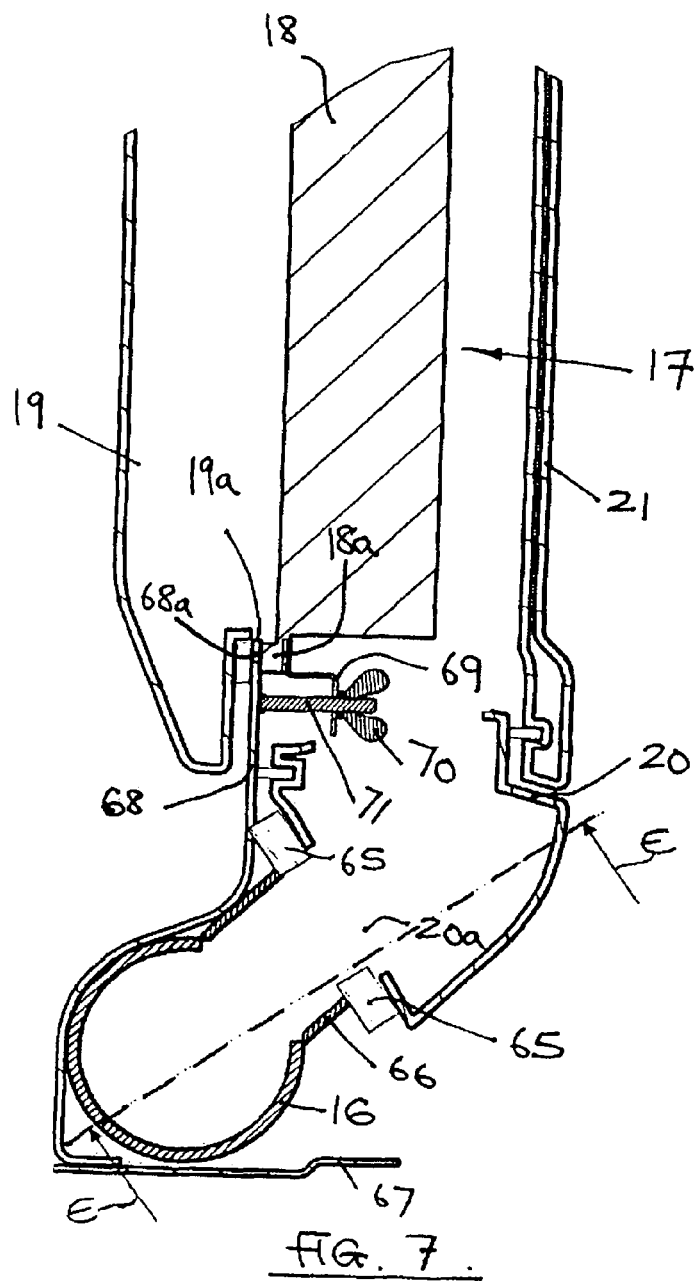
FIG. 7 shows part of FIG. 6 on a larger scale.

In accordance with the present invention the filter housing 20 has hollow inlet chambers 20a at each end which are sealed at 65 to an outlet 66 provided in the adjacent cab pillar 16. The structural pillar 16 is surrounded by sheet metal or plastics panel work 67 which includes a rear external panel 68 of the cab. In the arrangement shown in FIGS. 6 and 7, filter housing 20 is secured to the rear panel 68 of the cab using bolt holes 20h. The air filter 18 includes a peripheral sealing area 18a which is clamped against a portion 68a of the rear panel 68, which surrounds an output aperture 19a formed in the rear panel 68 of the cab, by a frame 69 and an associated wing nut 70 which engages bolts 71 welded the rear panel 68. Aperture 19a leads to duct 19. Seals 68b are provided between the housing 20 and the rear panel 18.

Figures 9, 17:
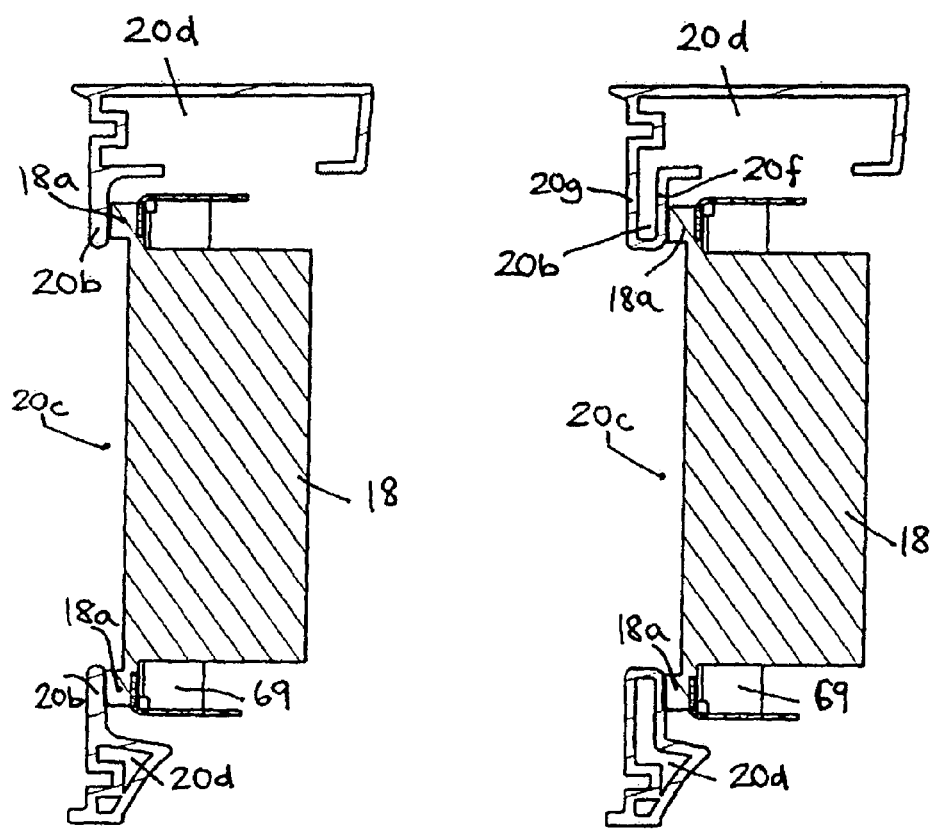
FIG. 9 shows a section on line similar to line F-F of FIG. 6 of part of an alternative filter housing construction.
FIG. 17 shows a section on a line similar to line F-F of FIG. 6 of part of a further alternative filter housing construction.
Figure 10:
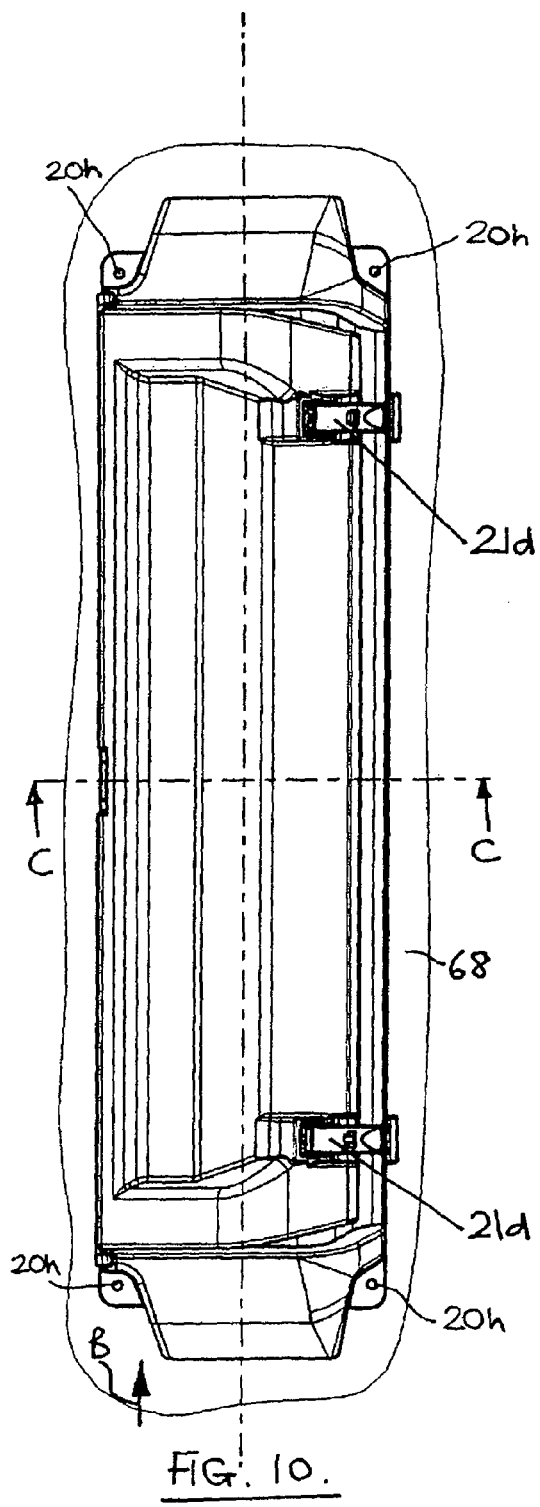
FIG. 10 shows a view in the direction of arrow A of FIG. 1 of the filter housing of the present invention.

In an alternative arrangement, shown in FIG. 9, the filter 18 is clamped against a filter mounting surface 20b which surrounds an output aperture 20c in the housing 20 leading to duct 19.

Figure 15:
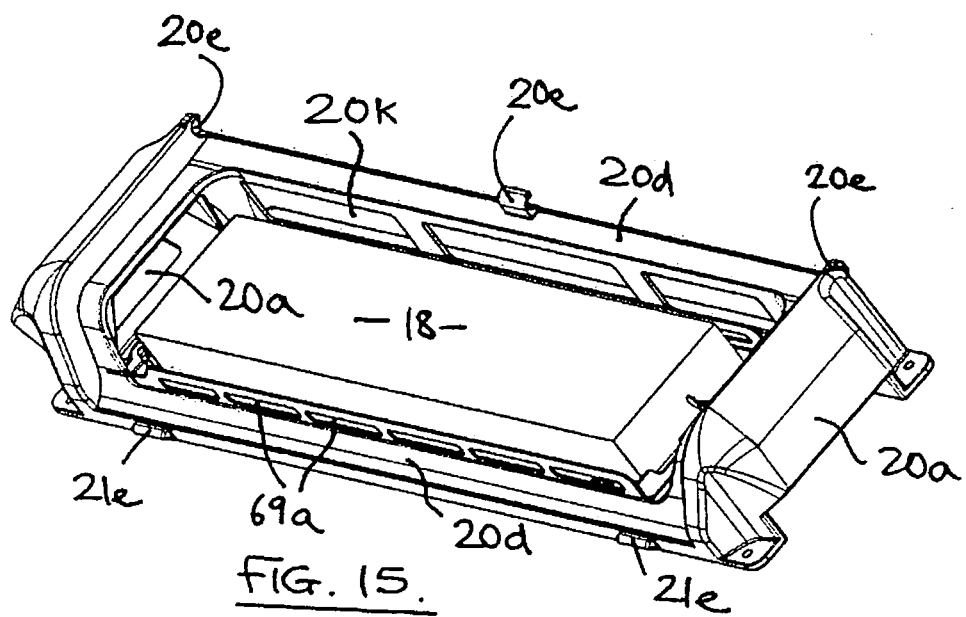
FIG. 15 is a perspective view of the filter housing with the access door removed.

The hollow chambers 20a are structurally connected by hollow side portions 20d of the housing (see FIGS. 13 to 15) which include apertures 20k so that the housing can be formed as a single piece plastics moulding by, for example, a blow moulding technique. This provides a relatively cheap to produce housing which is light in weight and which has the necessary rigidity.

Similarly, as can be seen from FIGS. 10 to 15, the access door 21 is also a hollow plastics moulding having inner and outer walls 21a and 21b which includes integral pivots 21c which snap into pivot housings 20e formed integrally with the housing. The snap-in design also allows quick disassembly of the access door 21 if the opening angle is limited by certain installations in the rear of the tractor (e.g. upper link of the three point hitch, hydraulic valve assembly). Thus the access door 21 is again of a relatively cheap, light and rigid construction. The door 21 is held in its closed position by the catches 21d which engage lugs 21e. The door 21 is sealed to the housing 20 by peripheral seal 21f.

As indicated above, the housing 20 and door 21 are designed so that they can both be formed by blow moulding. Blow moulding, sometimes called blow forming, is a technique for the forming of hollow plastic parts in which a body of plastics material, which may be formed by an extrusion process, is inserted in a mould which defines only the outer surface of the article to be formed and this body is then inflated by compressed air into contact with the internal walls of the mould to form the desired hollow article. The plastic is then allowed to cool and harden and is then ejected from the mould. Such a process is known as extrusion blow moulding and is economical to carry out compared with normal injection moulding where both the inside and outside surfaces of the article to be moulded must be defined by the mould which is therefore far more complex and expensive especially for small and medium quantities needed in tractor production.

The housing 20 and door 21 can also be produced by rotational moulding in which a measured quantity of polymer is loaded into the mould and the mould is heated and rotated about two or more axes until the polymer has melted and adhered to the mould wall. The mould is then cooled, usually by a fan, so that the polymer solidifies and shrinks away from the mould in a controlled manner to facilitate removal from the mould.

It is also an important feature of the filter housing of the present invention that the periphery of one side of the filter element 18 is clamped against the filter mounting surface 20b which surrounds the output aperture 20c of the housing 20 leading to duct 19 and that the housing is designed so that all the other remaining sides of the filter element are exposed evenly within a chamber 80 of the housing to receive incoming air to be filtered. This ensures a balanced delivery of air to the filter element 18. The apertures 20k in the housing sides and the apertures 69a in the frame 69 ensure good air flow around and towards the filter element.

The invention claimed is:

1. A generally rectangular tractor cab air filter housing arrangement having a main body portion with inlet zones at each end through which air enters the housing, a first outlet aperture in the housing over which a filter element is supported, and a second aperture in the housing in which a door is pivoted to provide access to the filter for maintenance, the inlet zones being formed as chambers which are structurally interconnected by side portions of the housing so that the housing can be formed as a single piece hollow plastics moulding.

2. A filter housing arrangement according to claim 1 in which the door is a hollow single piece plastics moulding.

3. A filter housing arrangement according to claim 2 in which the housing and/or the door are formed by blow moulding or rotational moulding.

4. A filter housing arrangement according to claim 1 in which the housing includes a filter mounting surface which surrounds the outlet aperture, the filter element being clamped against the mounting surface.

5. A filter housing arrangement according to claim 1 in which exterior sealing means on the housing surrounds the outlet aperture of the housing, the exterior sealing means being sealed against an exterior surface of an associated tractor cab, the filter element being clamped against a filter mounting surface which surrounds an aperture in the exterior surface of the cab within the exterior sealing means.

6. A filter housing arrangement according to claim 4 in which the filter element is clamped against the filter mounting surface by a frame which surrounds the filter element.

7. A filter housing arrangement according to claim 5 in which the filter element is clamped against the filter mounting surface by a frame which surrounds the filter element.

8. A filter housing arrangement according to claim 4 in which the filter element is of generally rectangular block form, the periphery of one side of the block being clamped against the filter mounting surface and the remaining five side of the filter element all being arranged to receive incoming air to be filtered.

9. A filter housing arrangement according to claim 5 in which the filter element is of generally rectangular block form, the periphery of one side of the block being clamped against the filter mounting surface and the remaining five side of the filter element all being arranged to receive incoming air to be filtered.

10. A generally rectangular tractor cab air filter housing arrangement having a main body portion with inlet zones at opposite ends through which air enters the housing, a first outlet aperture in the housing over which a filter element is supported in the main body portion, and a second aperture in the housing in which a door is pivoted to provide access to the filter for maintenance, a peripheral portion of one side of the filter element being clamped against a filter mounting surface which surrounds the outlet aperture and the remainder of the filter element, other than said one side, being exposed in the main body portion of the housing to incoming air to be filtered.

* * * * *